United States Patent [19]

Suzuki et al.

[11] 3,925,584
[45] Dec. 9, 1975

[54] ADHESIVE SEAL AND TAPE FOR SEALING

[75] Inventors: Nagayuki Suzuki; Tsutomu Nakamura; Katsuto Yamada, all of Tokyo, Japan

[73] Assignees: Daiichi Seiyaku Co., Ltd.; Sugawara Kogyo Co., Ltd., both of Tokyo, Japan

[22] Filed: Feb. 7, 1974

[21] Appl. No.: 440,484

Related U.S. Application Data

[63] Continuation-in-part of Ser. No. 283,416, Aug. 24, 1972, abandoned.

[52] U.S. Cl. ............... 428/40; 156/331; 156/332; 283/8 R; 428/344; 428/346; 428/352; 428/915
[51] Int. Cl.$^2$ ................... C09J 7/02; G09F 3/03
[58] Field of Search ........... 161/166, 167, 182, 213, 161/216, 217, 234, 235, 406; 156/331, 332; 283/8 R; 428/40, 344, 346, 352, 915

[56] References Cited

UNITED STATES PATENTS

| | | | |
|---|---|---|---|
| 2,368,140 | 1/1945 | Johnson | 161/213 X |
| 2,496,349 | 2/1950 | Kellgren et al. | 161/128 |
| 2,684,918 | 7/1954 | Oughton | 161/207 X |
| 2,778,760 | 1/1957 | Hurst | 161/235 X |
| 2,804,416 | 8/1957 | Phillipsen | 161/167 |
| 3,092,250 | 6/1963 | Knutson et al. | 161/217 X |
| 3,236,796 | 2/1966 | Moyer | 161/235 X |
| 3,400,103 | 9/1968 | Samour | 260/78.5 R |
| 3,542,621 | 11/1970 | Calhoun, Jr. et al. | 161/235 X |

*Primary Examiner*—George F. Lesmes
*Assistant Examiner*—Henry F. Epstein
*Attorney, Agent, or Firm*—Oblon, Fisher, Spivak, McClelland & Maier

[57] ABSTRACT

A new adhesive seal or tape is provided which consists of a laminated product formed by the application of a strong adhesive to one side of a thin-leaf material that is extremely fragile and easily torn. To the other side of the thin-leaf material is laminated a stronger support sheet by means of an interlying adhesive layer. Adhesive tapes composed of the laminated material of this invention when used to seal a package prevent the secret pilferage or theft of the contents of the packages, since the tape is irreparably damaged when removed.

9 Claims, 1 Drawing Figure

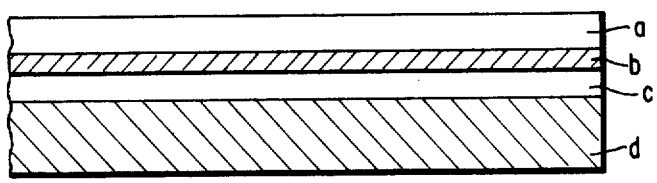

ADHESIVE SEAL AND TAPE FOR SEALING

CROSS-REFERENCE TO RELATED APPLICATIONS

This application is a continuation-in-part application of U.S. Ser. No. 283,416, filed Aug. 24, 1972 and now abandoned.

BACKGROUND OF THE INVENTION

1. Field of the Invention

The present invention relates to adhesive seals and adhesive tapes for sealing packages and the like. More particularly, it relates to adhesive seals and adhesive tapes for sealing purposes which are formed from a material consisting of a strong adhesive bonded to an extremely thin-leaf material laminated with a support sheet through a weak adhesive layer.

2. Description of the Prior Art

Heretofore, for the purpose of sealing packages such as cans, cartons and the like, adhesive tapes of paper and articles such as labels thereof as well as adhesive tapes of cellophane film or other synthetic resins have been used. However, these conventional adhesive tapes and adhesive articles have some deficiencies. One of the more prominent deficiencies is that these adhesive tapes or articles are easily removed from the surface of a sealed package by the application of water or heat on the tape or article without any consequent staining thereof. Thus, the package may be resealed using the same, used adhesive tape or article. As a consequence, the contents of a package or container sealed with conventional adhesive tapes and the like can be easily and secretly pilfered or changes without immediate detection.

SUMMARY OF THE INVENTION

Accordingly, it is an object of this invention to overcome the inability associated with conventional adhesive tapes and adhesive articles to maintain a seal or integrity on sealed packages and the like.

Briefly, this and other objects of this invention are achieved by providing an adhesive tape or the like which is a laminated product formed by the application of a strong adhesive to one side of a thin-leaf material that is extremely fragile and easily torn. To the opposite side of the thin-leaf material is laminated a stronger support sheet by means of an interlying adhesive layer.

BRIEF DESCRIPTION OF THE DRAWING

The FIGURE is an enlarged, cross-sectional view of the four layers of material used in the fabrication of adhesive tapes and articles in this invention.

DESCRIPTION OF THE PREFERRED EMBODIMENTS

In the FIGURE, $a$ is a portion of the outer support sheet of a tape or adhesive article, $b$ is a portion of an adhesive layer having a weak adhesion force, $c$ is a portion of a thin-leaf material layer of very poor strength, and $d$ is a portion of another adhesive layer with an adhesive strength greater than that of layer $b$. Portion $a$ can be made of a material which is effectively used in many conventional tapes. Suitable materials include films of cellophane or synthetic resins, unwoven cloth, cloth, paper, and the material prepared by arranging threads of one of these materials or of several of these materials into a film. All of these materials must have a tensile breaking strength greater than 3 kg/25 mm width. Layer $b$ is a weak adhesive layer laminated to a thin-leaf material $c$ and to the support sheet $a$. Suitable adhesive materials for this layer include waxes, paraffins and mixtures thereof which have an adhesive strength in the range of 50 to 400 g per 25 mm width.

The important aspect of this invention is the adhesive strength of the adhesive material and not its chemical composition. Any conventional adhesive such as a wax or paraffin having a suitable adhesive strength may be used.

Such waxes include the various microcrystalline waxes sold by the Mobil Oil Corporation and described in the technical publication "High Melting Point Waxes". They are Mobilwax Grese, Mobil Microwax 190Y which are hard, microcrystalline waxes having a melting point of from about 83° to about 93°C; Mobil Wax 2300, Mobilwax 2305 which are plastic microcrystalline waxes having a melting point of about 77°C; Mobil Microwax 190Y-EM which is an emulsifiable microcrystalline wax having a melting point of 88°C; and Pegawax 602 which is a crude microcrystalline wax having a melting point of 77°C. In addition, adhesive compositions can be prepared having any desired strength within the aforementioned range by adding varying the amounts of a paraffin wax and a microcrystalline wax to provide an adhesive with the desired adhesive strength.

Layer $c$ is the most important part of the seals and tapes of this invention, and consists of an aluminum foil which is preferably used, having a tensile breaking strength of less than 2 kg per 25 mm width. Other suitable thin-leaf materials include fragile paint films or easily torn thin paper strips. All of the materials of this layer must have the proper thickness so they are easily torn when the tape and adhesive articles of this invention are stripped from a sealed package or container.

Adhesive layer $d$ must have an adhesive strength greater than weak adhesive layer $b$, and a strength greater than the strength of layer $c$. Suitable adhesives include pressure sensitive adhesives or heat sensitive adhesives of a series of natural rubbers, synthetic resins and the like. Again, the particular chemical composition of the strong adhesive is not critical so long as the adhesive has an adhesive strength greater than that of the weak adhesive layer and a layer $c$.

Such strong adhesives include acryl-adhesive which consists of two broad classes, thermoplastic adhesives and bridge-construction adhesives. The former is produced by copolymerizing at least two members selected from acrylic esters, vinylchloride, acrylonitrile or the like, and dissolving the resulting copolymer is an organic solvent, and then adding a tackifier and softener to the solution to provide the proper viscosity.

The bridge-construction-type adhesive may be produced by copolymerizing an acrylic ester wherein the ester moiety contains five or more carbon atoms, that is, has a carbon number higher than butyl; with a vinyl monomer containing carboxyl, hydroxy or a hydroxymethyl radical, esters thereof, glycidyl, amides, substituted amide or the like, and then adding a bridging agent if desired. Examples of suitable adhesives which may be used include the crosslinkable pressure sensitive adhesive polymers disclosed in U.S. Pat. No. 3,400,103, the disclosure of which is incorporated herein by reference.

Other adhesives which can be activated by water or other solvents may be used as well.

By the use of tapes and adhesive articles formed from the material of this invention, secret pilferage or change of the contents of a package or container can be prevented. This results because it is impossible to strip the adhesive article or the adhesive tape from the surface of a container without ripping or staining the article or tape. If anyone attempts to remove an adhesive tape or article from a container, only the outermost support sheet $a$ is usually stripped from the package or container and thin-leaf material $c$ remains on the package because of the difference in adhesive strength between the strong adhesive layer $d$ and the weak adhesive layer $b$. On occasion, the thin-leaf material $c$ is torn because of its poor strength. Thus, the rupture or partial separation of layer $a$ from layer $c$ is caused by the clever combination of an extremely weak thin-leaf material $c$ with two kinds of adhesive materials. Furthermore, if anyone attempts to decrease the adhesive strength of the adhesive layer $d$ by the application of water or steam to the adhesive article or tape, the adhesive strength of layer $b$ is decreased to a greater extent than layer $d$. Thus, the tape or article cannot be removed under these conditions as an integral unit. All attempts to remove the tapes or articles of this invention without tearing or ripping of the same have failed.

The adhesive tapes or articles of this invention can be formed by combining the materials of layers $a$, $b$, $c$, and $d$ according to conventional methods for producing laminated films or tapes. If a pressure sensitive adhesive is used in layer $d$, it is covered with a stripping paper having its surface adjacent layer $d$ coated with a typical stripping agent to protect the outer adhesive layer $d$. More conveninetly, the tape or article may be coated on its outer layer $a$ with a stripping agent prior to being rolled into a roll.

As described above, ideal sealing of a package or container is accomplished by the tapes or articles of this invention. Once an object is sealed, the seal cannot be removed from the surface of a container without being irreparably damaged.

The following example will more clearly explain the present invention.

EXAMPLE 1

To one side of an aluminum foil about 0.01 mm thick (tensile breaking strength of 1 kg per 25 mm width), was applied molten wax (Mobilwax 2305 having an adhesion strength of 100 g per 25 mm width) melting at 60° to 90°C in a thickness of 0.005 mm by a gravure roll coater. A cellophane film (tensile breaking strength of 6 kg per 25 mm width) having a thickness of about 0.03 mm was laminated to the wax-coated surface, cooled with a cooling roll and wound onto a reel. To the opposite side of the aluminum foil was applied an acryl-adhesive layer (adhesion strength of 1,000 g per 25 mm width) about 0.05 mm thick, dried at about 40°C for 5 to 10 minutes, and then cooled. To this surface, a stripping paper having a thickness of about 0.1 mm (tensile breaking strength of 15 kg per 25 mm width) was laminated and wound to form a roll of tape. Various other adhesive articles were prepared by stamping said tape to give a roll containing adhesive articles such as labels, etc.

Having now fully described the invention, it will be apparent to one or ordinary skill in the art that many changes and modifications can be made thereto without departing from the spirit or scope of the invention as set forth herein.

What is claimed as new and intented to be covered by Letters Patent is:

1. An adheisve tape or article for sealing packages, containers and the like which comprises a weak thin-leaf material having a breaking strength of less than 2 kg/25 mm width laminated to a support sheet through an interlying weak adhesive layer consisting essentially of paraffin wax, microcrystalline wax or mixtures thereof having an adheisve strength in the range of 50 g to 400 g per 25 mm width and having the exposed surface of said thin-leaf material coated with a strong pressure-sensitive or heat-sensitive adhesive which has an adhesive strength greater than 500 g per 25 mm width.

2. The adhesive tape or article of claim 1, wherein the support sheet has a strength sufficient for normal taping operations.

3. The adheisve tape or article of claim 2, wherein the thin-leaf material is an aluminum foil and the support sheet is a cellophane film.

4. The adhesive tape or article of claim 1, wherein the surface of the strong adhesive is covered with a stripping paper whose surface adjacent the adhesive layer is coated with a stripping agent.

5. The adhesive tape or article of claim 1, wherein the weak adhesive is a microcrystalline wax and the strong adhesive is an acryl-adheisve.

6. The adhesive tape or article of claim 1, wherein the thin-leaf material is a paint film.

7. The adhesive tape or article of claim 1, wherein the strong adhesive is pressure sensitive.

8. The adhesive tape or article of claim 5, wherein the acryl-adhesive is a thermoplastic adhesive.

9. The adhesive tape or article of claim 8, wherein the strong adhesive is a copolymer of at least two members selected from acrylic ester, vinylchloride and acrylonitrile.

* * * * *